April 14, 1959 E. M. SMOLIN ET AL 2,882,299
PREPARATION OF ACRYLIC MONOMERS
Filed Feb. 12, 1957 3 Sheets-Sheet 1
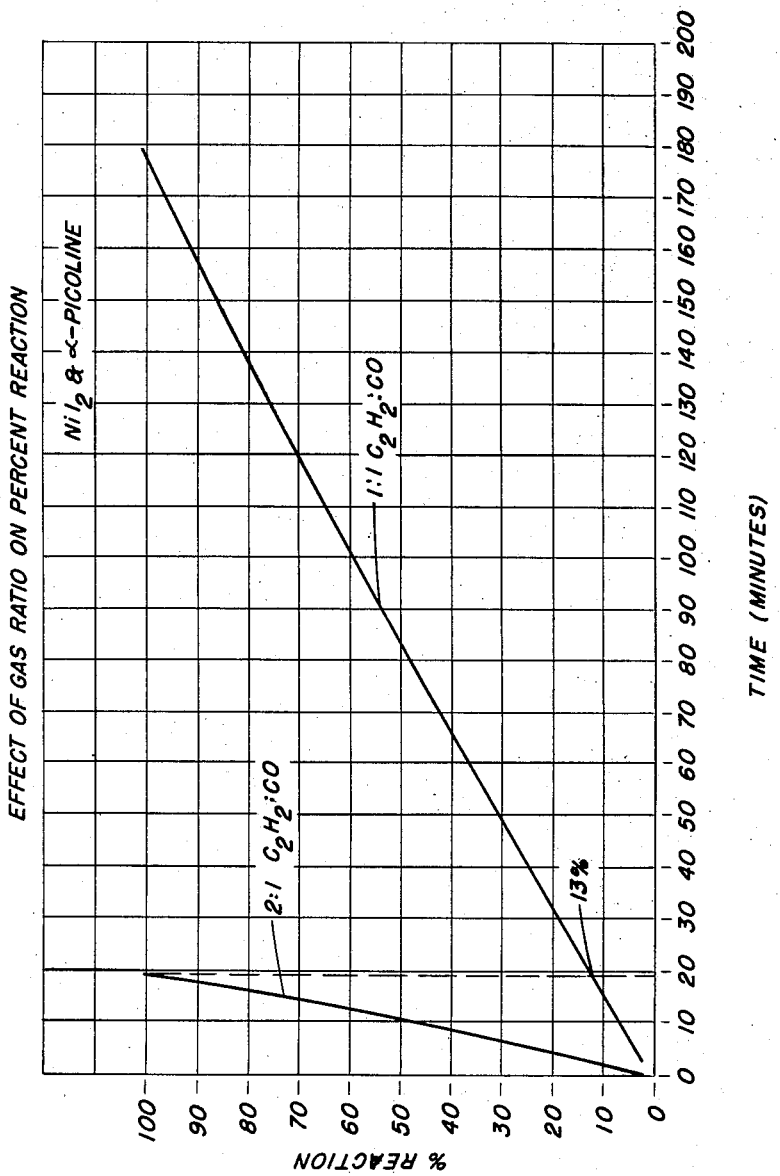
FIG. I
INVENTORS.
EDWIN M. SMOLIN
BENJAMIN J. LUBEROFF
BY
ATTORNEY

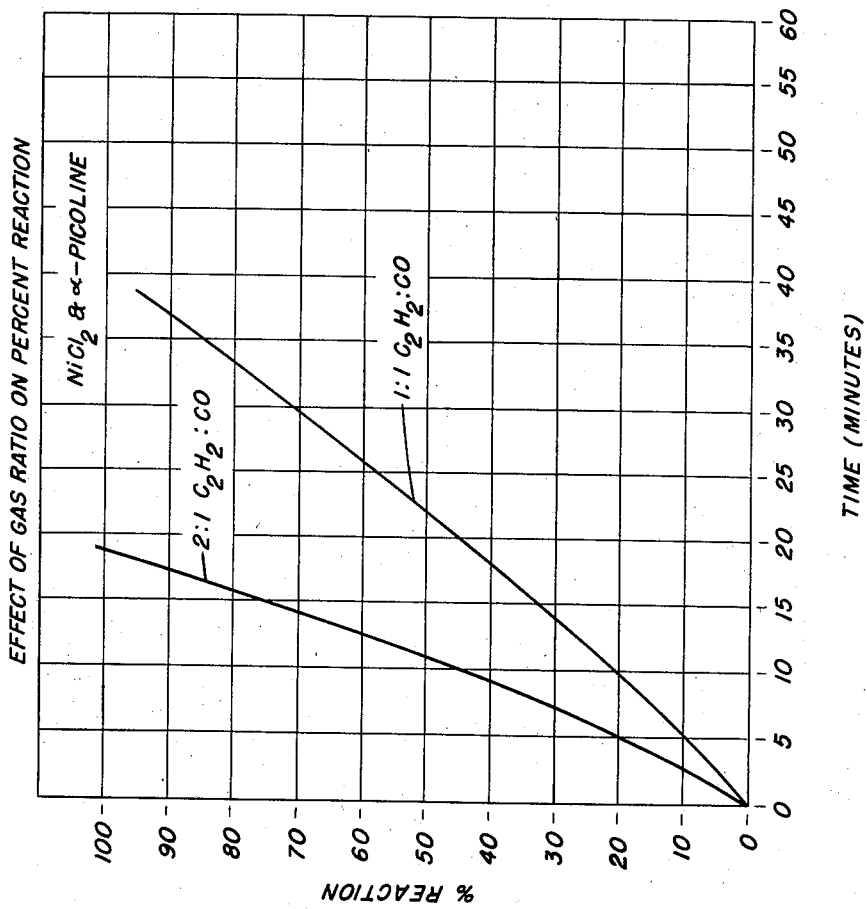

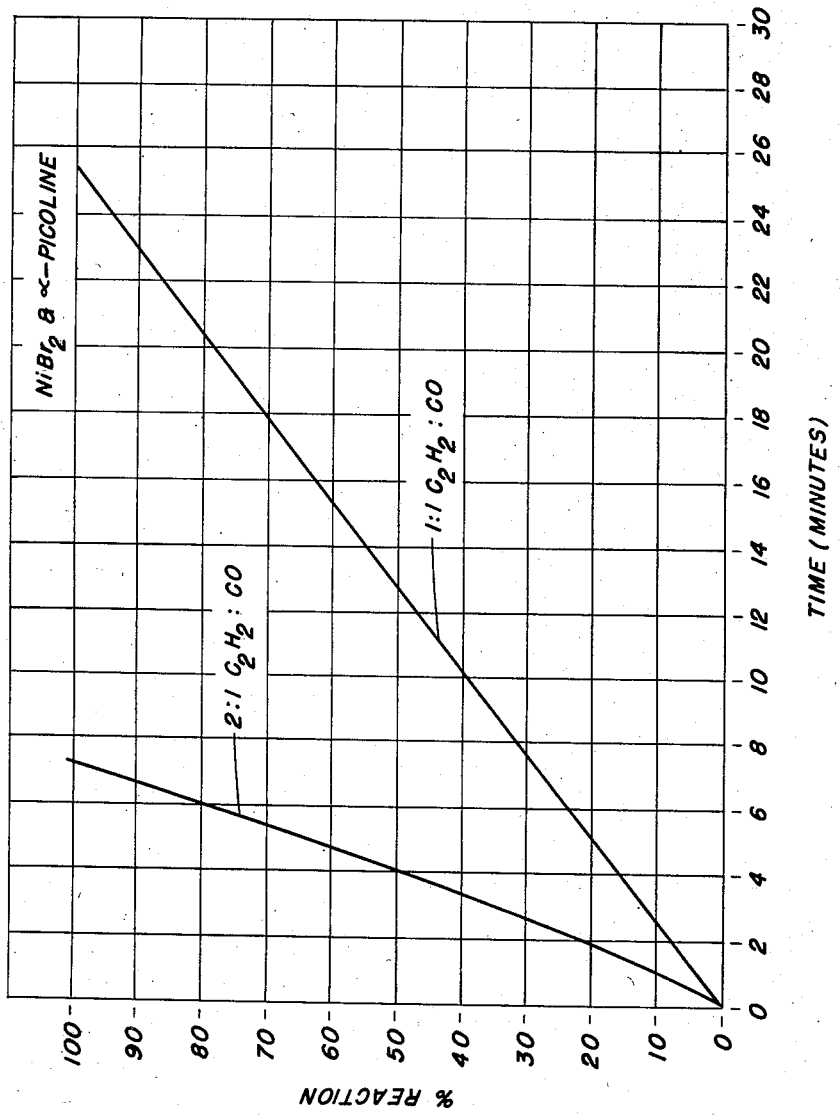

United States Patent Office 2,882,299
Patented Apr. 14, 1959

2,882,299

PREPARATION OF ACRYLIC MONOMERS

Edwin M. Smolin and Benjamin J. Luberoff, Stamford, Conn., assignors to American Cyanamid Company, New York, N.Y., a corporation of Maine Application February 12, 1957, Serial No. 639,784

9 Claims. (Cl. 260—486)

This invention relates to a novel and improved process for preparing acrylic acid and esters thereof. More particularly, the invention relates to an improvement in nickel halide-catalyzed, liquid-phase reactions at elevated temperatures and pressures of equivalent amounts of acetylene, carbon monoxide and an active hydrogen compound, such as water or an alcohol. Still more specifically, it is concerned with an improvement in carrying out such a reaction wherein during reaction the acetylene is maintained in stoichiometric excess over the carbon monoxide reactant in the presence of a menstruum comprising an alkyl-substituted pyridine or its equivalent.

It is known that equivalent quantities of acetylene, carbon monoxide and either water or an alcohol will react in the liquid phase to give acrylic acid or its ester, provided elevated temperatures, elevated pressures and a nickle halide catalyst are used. Unfortunately, this process is not entirely satisfactory and leaves much to be desired. For example, in high pressure-liquid phase reactions as previously practiced, the time for initiating the reaction is markedly long. Usually, under the conditions of temperature and pressure most favorable for reaction, about fifteen minutes or more is required to initiate reaction. Thus, acetylene which remains unreacted in the reaction vessel under known reaction conditions is of ever growing concern because it may present a serious explosion problem. Additionally, because the high pressure-liquid phase reaction as previously practiced requires long residence times prior to completion, polymerization and other reactions of the acrylic acid occur with attendant loss in yield.

Acrylic acid and esters thereof are valuable compounds of commerce. To the present, money, time and effort have been expanded to develop new procedures for producing the same, but a wholly satisfactory solution to the problem has not been found.

It is, therefore, a principal object of the present invention to provide a new and novel catalytic process for preparing acrylic acid or its esters in good purity while effecting reaction within a relatively short time. It is a further object of the invention to provide a novel process which will substantially reduce the explosion hazards.

According to the process of the present invention, it has been found that the shortcomings of the previous practice can be largely mitigated in a surprisingly straightforward manner. This is accomplished when two novel conditions are maintained. First is the provision of an excess of acetylene over carbon monoxide during the course of the reaction. Second is the provision for the presence of an alkyl-substituted pyridine menstruum. The reaction may advantageously be conducted at temperatures as low as 150° C. and under pressures as low as 200 p.s.i. when a stoichiometric excess of acetylene with respect to carbon monoxide is maintained. Usually, not more than five moles of acetylene per mole of carbon monoxide can be reacted in the present process.

A wide variety of alkyl-substituted pyridines or their equivalents, such as alkyl-substituted quinolines, can be employed in the reaction menstruum. Advantageously, a small amount of base up to about 5% is found sufficient for purposes of successfully conducting the process of the invention.

For a fuller understanding of the nature and objects of the invention, reference should be had to the following detailed description taken in conjunction with the accompanying drawing, in which:

Figure 1 is a graph depicting percent reaction versus time in a picoline-nickel iodide catalyzed reaction;

Figure 2 shows a picoline-nickel chloride catalyzed reaction in which time and percent reaction are correlated; and Figure 3 depicts the effect of a picoline-nickel bromide menstruum.

As is shown in the accompanying drawings, Figure 1 depicts the effect of the variations in the acetylenic-carbon monoxide gas ratio with respect to space time yields. In both instances, nickel iodide and alpha picoline comprise the catalyst system. This figure further shows that to achieve almost quantitative space time yields, approximately three hours would be required when a 1:1 ratio of acetylene to carbon monoxide is maintained. However, when a 2:1 ratio of acetylene to carbon monoxide is provided, similar space time yields would be obtained in twenty minutes or less.

Similarly, as shown in Figures 2 and 3 of the drawings, in using nickel chloride and nickel bromide respectively, the time for effecting completion of reaction is substantially greater in the situation where substantially stoichiometric amounts of acetylene to carbon monoxide are used as contrasted with a stoichiometric excess of acetylene to carbon monoxide.

It is an advantage of the present invention that the provision of acetylene in stoichiometric excess over the carbon monoxide permits reaction to take place at a given rate easily and smoothly at temperatures and pressures lower than those previously used. It is also an advantage that the nickel halide catalyst can be materially activated by the presence of an alkyl-substituted pyridine or alkyl-substituted quinoline base. It is a further advantage that the process may be conducted in a batch, semi-continuous or continuous manner and, if desired, in the presence of an inert solvent, such as for example, tetrahydrofuran and glycol-diethers. Illustrative glycol-ethers include: ethylene glycol diethyl ether, diethylene glycol diethyl ether, ethylene glycol dimethyl ether and the like.

The proportion of acetylene employed in the process of the invention may vary over a wide range. Speaking generally, any proportion of acetylene in excess of an equimolar ratio of acetylene to carbon monoxide is within the purview and scope of this description. More specifically, it has been found that for most purposes from about 1:1 to almost 5 moles of acetylene per mole of carbon monoxide can be advantageously used. The latter acetylene quantity corresponds to from 10% to 400% excess over that of carbon monoxide. Where larger quantities of acetylene have been used, increased beneficial results are not noted. It is preferred to employ of from 1:2 to 2:0 moles of acetylene per mol of carbon monoxide.

In general, a variety of nickel halide catalysts may be used herein. For example, nickel chloride, nickel bromide or nickel iodide is satisfactory. Concomitantly, an alkyl-substituted pyridine or alkyl-substituted quinoline base, and mixtures thereof can be used. Illustrative of latter category is: alpha methyl pyridine (alpha picoline), beta picoline, gamma picoline, alpha methyl quinoline (alpha quinaldine), 2-methyl-5-ethyl pyridine (alpha collidine), alpha propyl pyridine, alpha-n-butyl pyridine and mixtures thereof. The quantity of latter base required for reaction is relatively small. Amounts in the range of from about 0.05% to about 5.0% based on the combined weights of the reactants are satisfactory. In general, a good preferred practice is to employ said base in amounts ranging from 0.3% to about 1.5%.

Where an ester of acrylic acid is desired, any alcohol, and particularly a primary or secondary aliphatic monohydric alcohol, may be employed provided it is soluble in the reaction medium under reaction conditions. Illustrative of the latter alchol is included: methyl alcohol, ethyl alcohol, n-propyl alcohol, isopropanol, n-butyl alcohol, sec-butyl alcohol, octyl alcohol, lauryl alcohol and oleyl alcohol. Polyhydric alcohols may also be used, as for example, ethylene gylcol, propylene glycol, glycerine and pentaerythritol.

To facilitate an understanding of the invention, the following examples will serve to illustrate some of the more specific details of the invention. Unless otherwise stated, the parts given are by weight.

*Example 1*

A suitable autoclave containing 0.28 part of $\alpha$-picoline and 0.19 part of nickel iodide dissolved in 142 parts of n-butanol is heated to about 180° C. The latter autoclave is next charged with a gas mixture comprising acetylene and carbon monoxide in a mole ratio of 2:1 respectively. A total pressure of 400–450 pounds per square inch (p.s.i) is observed. The reaction mass is agitated and maintained at the autoclave temperature of about 180° C. Within 21.5 minutes, the pressure decreases by about 100 p.s.i. The autoclave is permitted to cool and the excess gases are vented. The reaction mass is filtered and the filtrate is distilled under vacuum. Butyl acrylate is recovered as distillate in good purity.

*Example 2*

To demonstrate the effect of various alkyl-substituted pyridine bases on reaction time, Example 1 is repeated in every detail except that in three separate runs 2-methyl-5-ethyl pyridine, beta picoline and gamma picoline are substituted for the $\alpha$-picoline base. The time for reaction is reduced somewhat from 21.5 minutes to 16.9, 17.9 and 19.4 minutes, respectively.

*Example 3*

This example will serve to demonstrate the effect of utilizing a gas mixture comprising equivalent proportions of acetylene and carbon monoxide.

Repeating the procedure of Example 1 in every material aspect, but using a gas mixture consisting of one mole each of acetylene and carbon monoxide, 154 minutes are required to observe a 100 p.s.i. pressure drop. In the previous example, for instance, this pressure drop occurs within 21.5 minutes.

*Example 4*

This example will serve to illustrate the effect of using nickel bromide as the catalyst.

The procedure of Example 1 is repeated in every detail except that 0.41 part of nickel bromide in the form of nickel bromide trihydrate is substituted for nickel iodide. Within about seven minutes, the pressure drops by about 100 p.s.i., indicating the relatively rapid formation of butyl acrylate.

In an identical run as above but substituting equimoles of acetylene and carbon monoxide, a pressure drop of 100 p.s.i occurs within 25.3 minutes which on a comparative basis is a four fold increase in time.

When 2-methyl-5-ethyl pyridine is substituted for alpha picoline in the procedure of the example above, the time for reaction is further reduced from about seven minutes to about four minutes.

*Example 5*

A suitable autoclave containing 0.41 part of beta picoline and 0.83 part of nickel chloride dissolved in 10 parts of water and 150 parts of diethylene glycol diethyl ether is heated to about 230° C. and then is charged with a gas mixture containing 3 moles of acetylene and 1 mole of carbon monoxide until a pressure of about 400–450 p.s.i. is obtained. The reaction mass is maintained at a temperature of about 230° C. Within about fifty minutes, the pressure decreases by about 100 p.s.i. The autoclave is cooled and excess gases are vented. The reaction contents are then distilled under vacuum. Acrylic acid is recovered as distillate in good purity.

*Example 6*

The procedure of Example 5 is repeated in every material detail except that the gas mixture is varied so as to comprise 1 mole of acetylene and 1 mole of carbon monoxide. There is no drop in pressure and therefore no reaction even after ten hours.

*Example 7*

To a suitably heated autoclave maintained at about 200° C. and containing 0.28 part of $\alpha$-picoline and 0.59 part of nickel chloride dissolved in 142 parts of n-butanol is charged a gas mixture comprising two moles of acetylene and one mole of carbon monoxide to a total pressure of about 400 p.s.i. The reaction mass is agitated while maintaining a temperature of about 200° C. In about thirty minutes, the pressure decreases by about 100 p.s.i. The autoclave is then permitted to cool and the excess gases are vented or otherwise eliminated therefrom. The resultant reaction mass is filtered and distilled. Butyl acrylate is recovered in good purity.

*Example 8*

Repeating Example 7 in every material respect except that a mixture of alpha, beta and gamma picoline is substituted for the alpha picoline, the time of reaction is reduced to about twenty-five minutes.

In a separate run, quinaldine was substituted for the mixture of picolines with a resultant pressure drop of 100 p.s.i. in 30.5 minutes.

The examples following will serve to illustrate the continuous operation of the process both in the presence and absence of an alkyl-substituted pyridine base. Similarly, an alkyl-substituted quinoline base may also be used.

*Example 9*

This example illustrates the absence of an alkyl-substituted pyridine base.

A solution containing 8.18 grams per liter of nickel bromide in the form of its trihydrate in n-butanol is pressure fed to the bottom of an autoclave which is maintained at a temperature of about 195° C. Acetylene and carbon monoxide in a mole ratio of two to one respectively are fed to the bottom of the heated autoclave through separate port openings located therein. The total pressure in the reactor is maintained at 350 p.s.i. by the continuous addition of gas mixture in the mole ratio as set forth previously.

The liquid feed rate of solution is adjusted so that the time of residence within the reactor is 45 minutes. Liquid is withdrawn from the uppermost portion of the reactor and the pressure within the reactor is maintained constant by the release of the withdrawn liquid through a pressure let-down valve. Resultant liquid is next recovered in a collecting tank. Butyl acrylate as the collected liquid is obtained at a space time yield of 11 grams per hour per liter.

*Example 10*

This example illustrates the presence of the alkyl-substituted pyridine base, alpha picoline.

Repeating the previous example in every material detail except that 7.4 grams per liter of alpha-picoline are added, the space time yield is found to be 80 grams per hour per liter. Stated otherwise, the presence of the ancillary alkyl-substituted pyridine base increased the space time yield eight fold as contrasted with the process in which the alkyl-substituted derivative is omitted.

*Example 11*

In this example, the process of Example 10 is repeated except that the residence time of the reaction mixture is decreased from 45 minutes to 25.5 minutes. This decrease in time is accomplished by increasing the reactor feed rate. The space time yield of butyl acrylate is 110 grams per hour per liter. The yield increase herein is ten-fold as compared with Example 9 in which no pyridine base is present.

*Example 12*

Example 11 is repeated in every detail except (*a*) that the mole ratio of acetylene to carbon monoxide is adjusted to 1:1 and (*b*) that the residence time within the reactor is held to about two hours and forty-five minutes. Notwithstanding the increased residence time, the product obtained in terms of space time yield is reduced to 18 grams of butyl acrylate per hour per liter as compared with the corresponding yield of the previous example.

*Example 13*

To a heated autoclave maintained at about 195° C. is added under pressure a solution containing 7.4 grams of alpha picoline and 8.2 grams of nickel bromide in the form of its trihydrate in ethanol. A gas mixture of 2 moles of acetylene and one mole of carbon monoxide is next fed through separate port openings into the bottom of the autoclave. The total pressure in the autoclave is maintained at from 600 to 650 p.s.i. by continuously adding the gas mixture of acetylene and carbon monoxide.

The liquid feed rate is adjusted such that the residence time within the autoclave is approximately 167 minutes. Liquid is continuously withdrawn from the uppermost portion of the reactor autoclave. The pressure within the latter is maintained constant by the release of the withdrawn or issuing liquid through a conventional letdown valve. Resultant liquid is next recovered in a collecting vessel. Ethyl acrylate is obtained therein at a space time yield of 47 grams per hour per liter.

*Example 14*

Repeating the procedure of Example 13 in all details except that no alpha picoline is present, ethyl acrylate is obtained in a substantially reduced space time yield of 8 grams per hour per liter.

Although a total pressure of 350–450 p.s.i. has been employed in all of the foregoing examples, the pressure may vary widely from about 200 p.s.i. to about 1000 p.s.i., and preferably from about 250 p.s.i to about 700 p.s.i. The temperature, however, may also be varied over a wide range from about 150° C. to about 230° C.

We claim:

1. In a process for reacting equivalent amounts of acetylene, carbon monoxide and an active hydrogen compound selected from the group consisting of water and an alcohol in the liquid phase at an elevated temperature of from about 150° C. to about 250° C. under atmospheric pressure of from 200 p.s.i. to 1000 p.s.i. in the presence of a nickel halide catalyst, the improvement therein which consists in providing at least a 10 mole percent excess of acetylene with respect to carbon monoxide in the presence of from 0.05% to about 5% of a nitrogen heterocyclic compound selected from the group consisting of lower alkyl-substituted pyridines and lower alkyl-substituted quinolines and mixtures thereof, and recovering corresponding acrylic acid derivative in good purity.

2. A process according to claim 1 in which the amount of acetylene is present in the mixture of from 1.1 to about 5 moles of acetylene per mole of carbon monoxide.

3. A process according to claim 1 in which the alkyl-substituted pyridine menstruum is alpha methyl pyridine.

4. A process according to claim 1 in which the alkyl-substituted pyridine menstruum is beta methyl pyridine.

5. A process according to claim 1 in which the alkyl-substituted pyridine menstruum is gamma methyl pyridine.

6. A process according to claim 1 in which the alkyl-substituted pyridine menstruum is 2-methyl-5-ethyl pyridine.

7. A process according to claim 1 in which the alkyl-substituted pyridine menstruum is alpha methyl quinoline.

8. A process according to claim 1 in which the alkyl-substituted pyridine menstruum is a mixture of alkyl-substituted pyridines.

9. A process according to claim 1 in which the process is conducted in a continuous manner.

References Cited in the file of this patent

UNITED STATES PATENTS

| 2,738,364 | Reppe et al. | Mar. 13, 1956 |

FOREIGN PATENTS

| 872,205 | Germany | Mar. 20, 1953 |
| 750,538 | Great Britain | June 20, 1956 |

OTHER REFERENCES

Copenhaver et al.: "Acetylene and Carbon Monoxide Chemistry," (1949), pp. 257–9, 263–4.

UNITED STATES PATENT OFFICE
CERTIFICATE OF CORRECTION

Patent No. 2,882,299 April 14, 1959

Edwin M. Smolin et al.

It is hereby certified that error appears in the printed specification of the above numbered patent requiring correction and that the said Letters Patent should read as corrected below.

Column 2, line 54, for "1:1 to almost" read -- 1.1 to almost --.

Signed and sealed this 29th day of September 1959.

(SEAL)
Attest:
KARL H. AXLINE
Attesting Officer

ROBERT C. WATSON
Commissioner of Patents